June 26, 1934.  P. VAN H. WEEMS ET AL  1,964,012
SPEED AND DRIFT INDICATOR
Filed Feb. 2, 1932
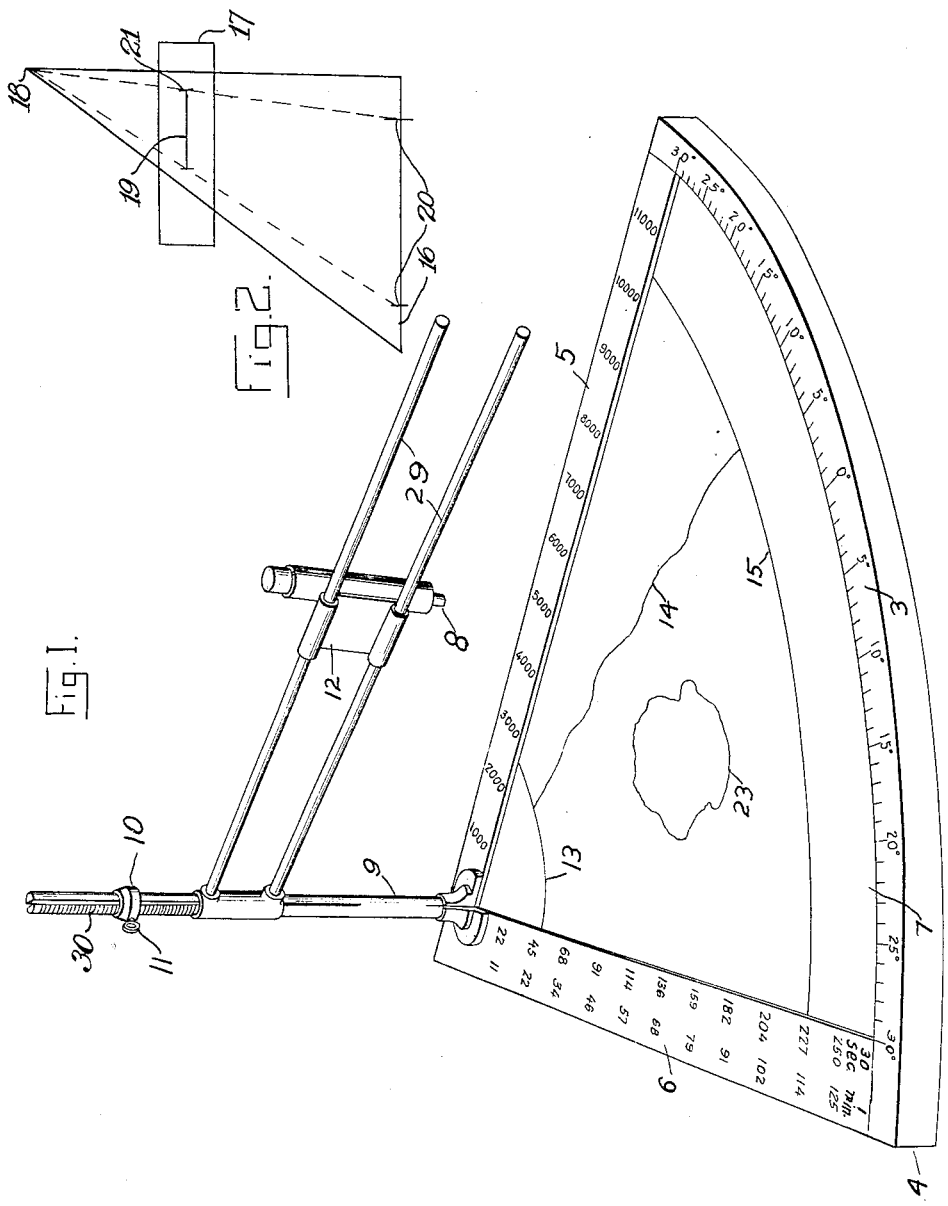
INVENTORS
H.C.Gatty and P.V.H.Weems.
BY
Robert A. Lavender
ATTORNEY Patented June 26, 1934

1,964,012

UNITED STATES PATENT OFFICE 1,964,012

SPEED AND DRIFT INDICATOR

Philip Van Horn Weems, United States Navy, and Harold C. Gatty, Washington, D. C.

Application February 2, 1932, Serial No. 590,400

8 Claims. (Cl. 33—20)

(Granted under the act of March 3, 1883, as amended April 30, 1928; 370 O. G. 757)

This invention relates to an instrument for determining the angle of drift and the ground speed of an aircraft, and has for its object to provide a simple and easily operated device for obtaining the data mentioned.

With the above and other objects in view, the invention consists in the construction, combination and arrangement of parts as will be described more fully hereinafter.

In the drawing:

Fig. 1 is a perspective view of the instrument;

Fig. 2 is a diagram showing an application thereof of measuring distances or mapping to scale.

The principle underlying our invention is the equality of proportion between corresponding parts of similar triangles. Knowing the altitude of the craft from altimeter readings and the distance of the eye above the working surface of the instrument, it is possible to determine, from distances marked on the working surface during a known time interval, the ground distances represented thereby.

A scale 3 of drift angles is inscribed upon the arcuate side of sector-shaped frame 4, which may be of any suitably rigid material adaptable to the purpose. A distance scale 5, calibrated in feet, is laid out on one radial side of the frame and a scale 6 of speed in miles per hour determined by observations extending over thirty seconds or a minute is given in columns under designations of those time intervals on the other radial side thereof. In frame 4 is mounted a sheet 7 of transparent material adapted to take the mark of a pencil 8.

A standard 9 is mounted at the apex of the frame 4, and a supporting structure, shown as comprising two arms 29 that extend out over sheet 7, is slidably and rotatably mounted on standard 9. Collar 10 carrying eye-piece ring 11 is also slidably mounted on the standard to be adjustable as to its distance above sheet 7 to give it a position to correspond to the altitude of the craft above the ground. Mounting 12 is freely slidable on arms 9 and carries the pencil 8. The standard 9 may be provided with a scale 30 to indicate the setting of collar 10 for the usual flying altitudes. The instrument is mounted with the line joining the apex of the frame and the zero mark on the drift scale parallel to the fore and aft line of the craft, the apex of the frame being directed forward.

The method of determining ground speed is as follows: Pencil 8 is placed in contact with sheet 7 at any convenient place and an arc 13 is struck to indicate on the scale a reference point for the beginning moment of the measurement. The observer places his eye adjacent ring 11 and aligns the point of pencil 8 with his eye and an object on the ground and keeps it so aligned for a time interval of either thirty seconds or a minute as determined by a watch, the point of the pencil meanwhile making a mark 14 that indicates the course of the craft; this line will not be straight due to the unavoidable deviations of the craft from motion in a straight line. At the end of the period, a second arc 15 is struck. The distance between the two arcs as shown by scale 5 is the travel of the craft during the chosen time, and the reading of the arc 15 on speed scale 6 less the reading of arc 13 on the same scale is the speed in miles per hour. If the chosen interval of observation were one minute, the speed is read in the right-hand column of the speed scale, and if the time were thirty seconds, it is read in the left-hand column thereof. In the latter case the speed would be 227 less 45 miles per hour or 182 miles per hour. The angle of drift is shown by the angle between a straight line on the mean position of the points of line 14 and the line joining the apex of frame 4 with the zero line on the drift angle scale. Scale 5 is really not necessary for speed determinations, but is useful in determining distances or in determining the scale in mapping.

In Fig. 2 the surface of the ground is represented by line 16 and sheet 7 by the plane 17, the eye of the observer being at apex 18. It is readily apparent that line 19 bears to line 20—20 the same ratio as does line 18—21 to line 18—20, and that therefore lines so drawn on sheet 7 are to a definite scale as regards distances or the outlines of areas on the surface of the ground so delineated. A scale map of an area may be made by the observer placing his eye at the ring 11 and keeping the point of pencil 8 in his line of sight while he follows with his eye around the boundary of an area on the earth's surface. Closed curve 23 on Fig. 1 represents a map so drawn, the distances on the ground represented by any part of the map being given by the calibrations on scale 5. It is of course understood that the height of ring 11 has been properly adjusted for the altitude of the craft.

It will be understood that the above description and accompanying drawing comprehend only the general and preferred embodiment of our invention, and that various changes in the construction, proportion and arrangement of parts may be made within the scope of the appended claims without sacrificing any of the advantages of our invention.

The invention described herein may be manufactured and used by or for the Government of the United States of America for governmental purposes without the payment of any royalty thereon.

We claim:

1. A navigating instrument comprising a sector-shaped frame having its arcuate side calibrated in degrees of arc, a scale of ground distances on one radial side and scales of ground speeds based on observation intervals of a minute and of thirty seconds on the other radial side; a standard mounted at the apex of said frame, a collar slidable thereon, a sighting ring carried by said collar, supporting means rotatably and slidably mounted on said standard and extending radially of said sector, a pencil mounting slidable on said means, a pencil in said mounting, and a transparent sheet in said frame adapted to be marked by said pencil.

2. A navigating instrument comprising a frame having an arcuate scale calibrated in degrees of arc, a distance scale radially disposed with respect to said arcuate scale, and a speed scale indicating speeds in miles per hour for observation intervals of one minute and of thirty seconds also radially disposed with respect to said arcuate scale; a standard on said frame substantially at the center of curvature of said arcuate scale, a sighting element slidably mounted on said standard, radially extending supporting means slidably and rotatably mounted on said standard, a transparent sheet adapted to be marked within said frame, and means carried by said supporting means to mark upon said sheet.

3. A navigating instrument comprising a transparent sheet adapted to be marked upon, an arcuate scale calibrated in degrees of arc, a distance scale radially disposed with respect to said arc and a speed scale also radially disposed with respect thereto all associated with said sheet, a standard mounted substantially at the center of curvature of said arcuate scale, sighting means carried thereby, supporting means also carried by said standard, and a marking element mounted upon said supporting means for universal movement over said sheet.

4. A navigating instrument, comprising a transparent member, sighting means variable with respect to its vertical distance from said member, marking means adapted to mark said member and to be maintained in the line of sight from said sighting means to an object visible simultaneously through said means and said member, and scale means fixedly associated with said member to determine distance traveled and speed by means of the mark made on said member while said marking means is so kept in the line of sight.

5. A navigating instrument comprising a transparent sheet adapted to be marked upon, an arcuate scale calibrated in degrees of arc, a distance scale radially disposed with respect thereto and a speed scale also radially disposed with respect thereto all associated with said sheet, a standard mounted substantially at the center of curvature of said arcuate scale, said standard having on it a scale representing altitudes of flight, sighting means slidably carried by said standard, for adjustment along said scale, scriber supporting means slidably and rotatably mounted on said standard and a scriber carried by said supporting means for movement on said sheet.

6. A navigating instrument comprising a transparent sheet adapted to be marked upon, an arcuate scale calibrated in degrees of arc, a distance scale radially disposed with respect to said arc and a speed scale also radially disposed with respect thereto all associated with said sheet, a standard mounted substantially at the center of curvature of said arcuate scale, said standard having on it a scale representing altitudes of flight, and sighting means slidably carried by said standard for adjustment along said scale.

7. A navigating instrument, comprising a transparent member, a standard fixedly relayed to said member having on it altitude calibrations, sighting means slidable on said standard to fix the position of the eye when observing an object through said member, marking means carried by said standard adapted to mark said member and to be maintained in the line of sight from said sighting means to an object visible simultaneously through said sighting means and said member, and scale means fixedly associated with said member to determine distance traveled and speed by means of the mark made on said member while said marking means is so kept in the line of sight.

8. A navigating instrument comprising a transparent sheet adapted to be marked upon, an arcuate scale calibrated in degrees of arc, a distance scale radially disposed with respect thereto and a speed scale also radially disposed with respect thereto all associated with said sheet, a standard mounted substantially at the center of curvature of said arcuate scale, sighting means carried thereby through which an object may be viewed simultaneously with viewing said object through said sheet, universally movable supporting means also carried by said standard and a marking element held by said supporting means for movement over said sheet.

PHILIP VAN HORN WEEMS.
HAROLD C. GATTY.